United States Patent [19]

McFarland et al.

[11] Patent Number: 5,784,867
[45] Date of Patent: Jul. 28, 1998

[54] VARIABLE FORCE TRACTION ENHANCE SYSTEMS

[75] Inventors: Douglas McFarland, 1625 19th Ave. #10, Route 2, Sidney, Nebr. 69162; Donald H. Parkes, Lamoni, Iowa

[73] Assignees: Shivvers Incorporated, Corydon; Douglas McFarland, Lamoni, both of Iowa

[21] Appl. No.: 538,814

[22] Filed: Oct. 3, 1995

[51] Int. Cl.⁶ .......................... A01D 34/64; A01D 75/18
[52] U.S. Cl. ................ 56/10.2 R; 56/10.4; 56/DIG. 3; 56/DIG. 11; 56/DIG. 10; 172/8
[58] Field of Search ................ 56/10.2 E, 10.2 R, 56/10.3, 10.4, 10.9, 11.2, 11.4, 11.9, 11.1, DIG. 11, DIG. 3, DIG. 10, DIG. 14; 172/7, 8; 188/280, 282; 180/6.48, 242

[56] References Cited

U.S. PATENT DOCUMENTS

| | | | |
|---|---|---|---|
| 3,908,345 | 9/1975 | Oni et al. | 56/208 |
| 4,126,994 | 11/1978 | Rockwell | 60/420 |
| 4,215,547 | 8/1980 | Molby | 60/465 |
| 4,310,078 | 1/1982 | Shore | 192/3 |
| 4,325,468 | 4/1982 | Siorek | 188/282 |
| 4,401,182 | 8/1983 | Pollman | 180/242 |
| 4,413,692 | 11/1983 | Clifft | 180/11 |
| 4,440,415 | 4/1984 | Wykhuis et al. | 280/460 |
| 4,470,260 | 9/1984 | Miller et al. | 60/422 |
| 4,474,271 | 10/1984 | Moulders et al. | 188/280 |
| 4,495,754 | 1/1985 | Cartner | 56/11.9 |
| 4,572,310 | 2/1986 | Peter | 180/6.24 |
| 4,624,346 | 11/1986 | Katz | 188/282 |
| 4,760,686 | 8/1988 | Samejima et al. | 56/15.8 |
| 4,809,796 | 3/1989 | Yamaoka et al. | 180/6.48 |
| 4,821,852 | 4/1989 | Yokoya | 188/322.15 |
| 4,832,318 | 5/1989 | Wang | 267/120 |
| 4,848,481 | 7/1989 | Bidon et al. | 172/7 |
| 4,874,066 | 10/1989 | Silberstein | 188/280 |
| 4,876,845 | 10/1989 | Sturgill | 56/6 |
| 4,886,142 | 12/1989 | Yamaoka et al. | 180/242 |
| 4,895,229 | 1/1990 | Kato | 188/282 |
| 4,896,489 | 1/1990 | Wykhuis | 56/15.9 |
| 4,899,525 | 2/1990 | Takei et al. | 56/202 |
| 4,905,799 | 3/1990 | Yamaoka | 188/322.15 |
| 4,919,215 | 4/1990 | Lee et al. | 172/450 |
| 4,920,732 | 5/1990 | Lee et al. | 56/10.2 |
| 4,926,621 | 5/1990 | Torras | 56/6 |
| 4,998,948 | 3/1991 | Osterling | 56/12.6 |
| 5,058,715 | 10/1991 | Silberstein | 188/280 |
| 5,106,065 | 4/1992 | Staton | 267/64.11 |
| 5,137,100 | 8/1992 | Scott et al. | 56/DIG. 11 X |
| 5,161,353 | 11/1992 | Bergkamp et al. | 56/6 |
| 5,316,113 | 5/1994 | Fumiyuki Yamaoka | 188/282 |
| 5,471,825 | 12/1995 | Panoushek et al. | 56/10.2 E |
| 5,515,669 | 5/1996 | Schick et al. | 56/DIG. 11 X |
| 5,533,325 | 7/1996 | Sallstrom et al. | 56/11.4 X |

*Primary Examiner*—Terry Lee Melius
*Attorney, Agent, or Firm*—Wallenstein & Wagner, Ltd

[57] ABSTRACT

The present invention provides variable force traction enhance systems for vehicles. The systems include one or more hydraulic cylinders connected to an implement and fluidly connected to one or more hydrostatic transmissions. The hydraulic cylinders actuate the implement in response to changes in the hydraulic fluid pressures in the hydrostatic transmissions. The actuated implement automatically shifts weight to vehicle drive wheels to improve traction and automatically prevents a rear end of the vehicle from bucking.

41 Claims, 4 Drawing Sheets

VARIABLE FORCE TRACTION ENHANCE SYSTEMS

FIELD OF THE INVENTION

This invention generally relates to variable force traction enhance systems. More specifically, this invention relates to variable force traction enhance systems especially useful on vehicles or tractors having an implement such as a cutting deck, bull dozer blade, or a grader blade, for example. The present invention automatically and instantly varies traction forces to enhance the vehicle's traction. The present invention can also function as an anti-buck device.

BACKGROUND OF THE INVENTION

A tractor is a common off-road and on-road motorized vehicle used to operate an implement. The implement may perform the function of mowing, plowing, grading, or lifting, for example. An out-front mower tractor is one type of tractor having an implement.

An out-front mower tractor is used to efficiently cut a relatively large amount of grass and other ground cover growth. An out-front mower tractor typically includes a motorized tractor having ground engaging wheels and a mower implement attached to the tractor. The mower implement also has ground engaging wheels. An out-front mower tractor has the mower implement positioned in front of the tractor; thus, when the tractor is moving in a forward direction, the tractor pushes the mower implement. Conversely, when the tractor is moving in a reverse direction, the tractor pulls the mower implement.

Existing tractors having an out-front implement have exhibited problems. For example, the tractor is typically operated under various conditions such as various speeds and various grades of terrain incline and decline. The amount of traction required is related to the various operating conditions. Increased vehicle traction is desired during a fast start and when traveling up a steep grade, for example.

However, existing tractors have not effectively and automatically adjusted the traction in response to vehicle operating conditions. Accordingly, optimal vehicle operation is not achieved and slipping of the vehicle's wheels may occur. Also, slipping wheels may cause damage to the ground terrain.

Existing tractor vehicles have also exhibited the problem of "bucking." Bucking occurs when the back end of the vehicle chassis "rears up." Bucking typically occurs when the vehicle is put into reverse or when the vehicle's speed is suddenly reduced. In particular, the rear end of the tractor rises up off the ground, pivots about the front drive wheels towards the implement, and then returns to the ground by pivoting away from the implement. The time duration of a buck is relatively short; however, the force of the rear end rising above the ground is significant.

Existing out-front mower tractors have compensated for bucking by adding weights to the tractor behind the drive wheels. The farther away the weights are from the drive wheels the more effective the weights are at preventing bucking. This additional weight causes the tractor to have poor traction because tractor weight is shifted off of the drive wheels and onto non-drive rear wheels which are mounted to the tractor behind the drive wheels. Traction may be particularly poor when operating the out-front mower tractor on a hill-side, for example as the extra weights have a tendency to cause the tractor to steer downhill.

Others have tried to overcome this problem of buck-compensating weights by adding heavy springs to support the rear chassis of the tractor. The heavy springs transfer weight from the out front implement back to the drive wheels for improved traction. However, this also counterbalances some of the weight on the rear wheels which negates some of the effect of the buck-compensating weights.

Therefore, needs exist to improve vehicles having out-front implements, particularly out-front mower tractors. The present invention satisfies these and other needs to improve vehicles. The present invention satisfies these needs by providing variable force traction enhance systems. The present invention also functions as anti-buck devices which reduce or prevent the rear end of the vehicle from bucking up and forward. Accordingly, present invention improves vehicle performance, operating efficiency, traction, and reduces costs.

Other aspects and advantages of the present invention will become apparent after reading this disclosure, including the claims, and reviewing the accompanying drawings.

SUMMARY OF THE INVENTION

The present invention provides variable force traction enhance systems for vehicles. Typically, the vehicles have an engine which drives one or more hydrostatic transmission. Each hydrostatic transmission drives a vehicle drive wheel. The systems include one or more hydraulic cylinders connected to an implement. Each hydraulic cylinder is fluidly connected to one hydrostatic transmission.

Vehicle operating conditions change, such as increasing forward speed, decreasing forward speed, traveling uphill and downhill, and moving in reverse. As the vehicle operating conditions change, the hydraulic fluid pressures in the hydrostatic transmissions also change. The varying hydraulic fluid pressures in the hydrostatic transmissions automatically actuate the hydraulic cylinders.

Accordingly, the hydraulic cylinders actuate the implement in response to changes in the hydraulic fluid pressures in the hydrostatic transmissions. The actuated implement automatically shifts weight to vehicle drive wheels to improve traction when there is increased resistance to forward vehicle motion. Alternatively, the actuated implement also automatically prevents a rear end of the vehicle from bucking during a decrease in forward speed or during reverse operation of the vehicle.

DETAILED DESCRIPTION OF THE INVENTION

Although the present invention can be made in many different forms, the preferred embodiments are described in this disclosure and shown in the attached drawings. This disclosure exemplifies the principles of the present invention and does not limit the broad aspects of the invention only to the illustrated embodiments.

Figure 1:
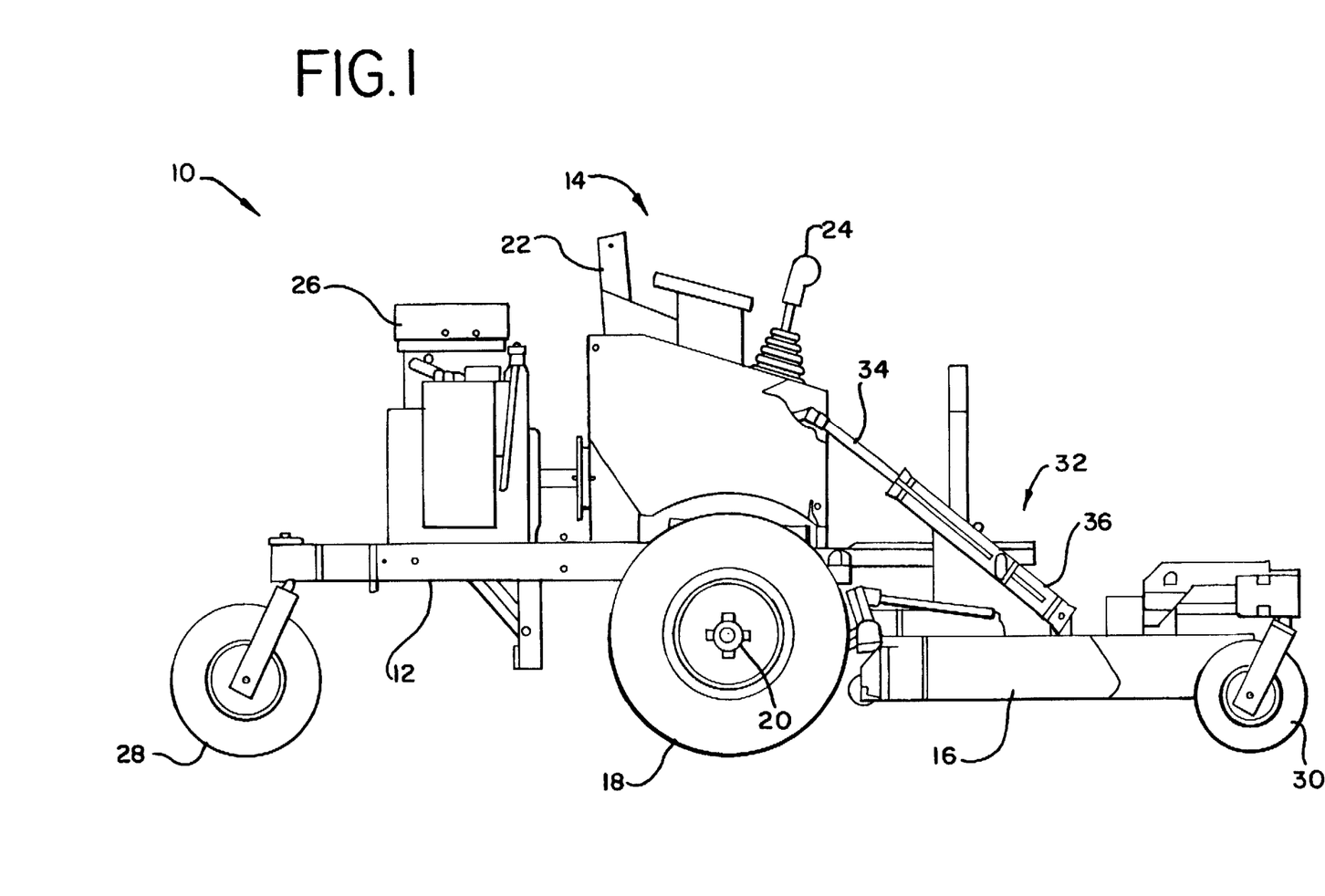
FIG. 1 is a side elevational view of a vehicle having a variable force traction enhance system made in accordance with the principles of the present invention.

Referring to FIG. 1, a variable force traction enhance system of the present invention is shown and described as embodied in an out-front mower tractor vehicle 10. The tractor 10 includes an engine deck 12, an operator cab 14, a cutting deck 16, and two opposed main drive wheels 18. The drive wheels 18 are mounted on two axles 20 that are coaxially aligned. FIG. 1 shows only one drive wheel 18 and one axle 20, which are the right drive wheel 18 and the right axle 20. The left side of the tractor 10 is the same as the right side and thus, the left side of the tractor 10 is not shown.

Each drive wheel 18 is driven by a hydrostatic transmission (shown in FIG. 2) that is controlled independently from the other hydrostatic transmission. A tractor operator controls both the speed and the direction of the tractor 10 by independently controlling the speed of each hydrostatic transmission and its corresponding drive wheel 18. For example, when the operator drives the left drive wheel 18 faster than the right drive wheel 18 in the forward direction, the tractor 10 will turn to the right.

The operator cab 14 is mounted above the drive wheels 18 and includes a driver seat 22 and a joystick 24 or any type of drive control. The operator uses the joystick 24 to control the hydrostatic transmissions and thus, the speed and direction of the tractor 10. The engine deck 12 is mounted on the tractor 10 rearward of the operator cab 14 and supports an engine 26. The engine deck 12 is supported by and pivotable about the axis of the drive wheels 18. A pair of opposed engine deck casters 28 also support the engine deck 12. The cutting deck 16 is mounted on the tractor 10 forward of the operator cab 14. The cutting deck 16 is supported by and pivotable about the axis of the drive wheels 18. A pair of opposed cutting deck casters 30 also support the cutting deck 16. One of the engine deck casters 28 and one of the cutting deck casters are located on the right side of the tractor; while, the other casters 28, 30 are located on the left side of the tractor.

The variable force traction enhance system of the present invention includes a pair of front hydraulic assemblies 32. Preferably, the hydraulic assemblies 32 are double acting hydraulic assemblies which function as lifting arms. Each front hydraulic assembly 32 includes a piston 34 and a cylinder 36. The front hydraulic assemblies 32 are mounted between the frame of the operator cab 14 and the cutting deck 16. More specifically, the piston 34 is mounted to the operator cab frame and the cylinder 36 is mounted to the cutting deck. Each one of the front hydraulic assemblies 32 is associated with one drive wheel 18 and the corresponding hydrostatic transmission. Accordingly, one hydraulic assembly 32 is mounted on the right side of the tractor 10 (as shown in FIG. 1) and the other hydraulic assembly 32 is mounted on the left side of the tractor 10.

Hydraulic fluid under pressure is separately supplied to each front hydraulic assembly 32 to impart a lifting force on a side of the cutting deck 16 that corresponds to the same side as the hydraulic assembly 32. The hydrostatic transmission on the right side of the tractor 10 supplies the right hydraulic assembly 32 with hydraulic fluid and the left hydrostatic transmission supplies the left hydraulic assembly 32. For example, as the right front hydraulic assembly 32 imparts an upward force on the right side of the cutting deck 16, a portion of the weight of the cutting deck 16 is shifted from the right cutting deck caster 30 to the right drive wheel 18. Shifting the cutting deck weight to the right drive wheel 18 imparts a downward force on the right drive wheel 18. This downward force increases traction between the right drive wheel 18 and the ground surface. As the amount of cutting deck weight shifted to the drive wheel 18 is increased, the traction between the drive wheel 18 and the ground surface is increased. Preferably, the cutting deck casters 30 remain in contact with the ground surface during shifting of the weight to the drive wheels 18. However, the cutting deck casters 30 may be lifted off of the ground surface during shifting of the weight to the drive wheels 18.

When the hydraulic fluid leaves the right hydraulic assembly 32 the cutting deck weight shifts back to the right cutting deck caster 30. The cutting deck 16 returns to it:3 most downward position. The left front hydraulic assembly 32 operates in a similar manner to the right front hydraulic assembly 32.

Figure 2:
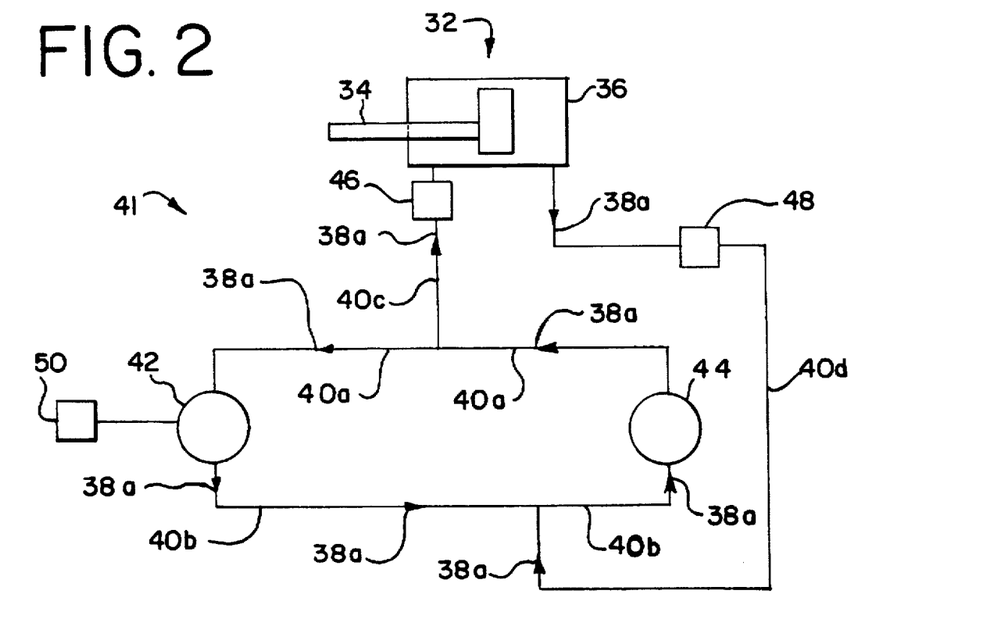
FIG. 2 is a schematic diagram of a variable force traction enhance system made in accordance with the principles of the present invention.

FIG. 2 shows a schematic diagram of a hydrostatic transmission 41 and a hydraulic assembly 32 according to the principles of the variable force traction enhance system. The hydrostatic transmission 41 includes a hydraulic motor 42 and a hydraulic pump 44. The engine 26 provides power to drive the hydraulic pump 44 which pumps the hydraulic fluid under pressure to the hydraulic motor 42. The hydraulic motor 42 drives the axle 20 of the corresponding drive wheel 18 to move the tractor 10 forward. The hydraulic fluid flows from the hydraulic motor 42 back to the hydraulic pump 44 to form a closed loop hydraulic fluid circuit. The arrows 38a on the hydraulic lines 40a, 40b, 40c, 40d show the direction of hydraulic fluid flow when the tractor 10 is traveling in the forward direction. If the tractor 10 is traveling in a reverse direction, then the flow of the hydraulic fluid is reversed as shown by the arrows 38b in FIG. 3.

As the hydraulic fluid flows toward the hydraulic motor 42, a portion of the hydraulic fluid, still under pressure, flows into the hydraulic assembly 32. The hydraulic fluid flows into the hydraulic assembly 32 and forces the piston 34 into the cylinder 36 which imparts a lifting force on the cutting deck 16. The hydraulic fluid then flows from the hydraulic assembly 32 to the inlet side of the hydraulic pump 44.

As described above, the lifting force lifts the cutting deck 16 upward to increase the traction of the drive wheel 18 by imparting a downward force on the drive wheel 18. The amount of lifting force applied to the cutting deck 16 is variable in relation to the pressure of the hydraulic fluid. The hydraulic fluid pressure that develops in the system is due to the resistance to motion of the hydraulic motor 42. If there is no resistance to the motion of the hydraulic motor 42 then there will be no hydraulic fluid pressure build-up in the system. As the resistance to motion of the hydraulic motor 42 increases, the hydraulic fluid pressure developed in the system increases. Of course, the engine 26 provides the power, through the hydraulic pump 44, to overcome the resistance to motion of the hydraulic motor 42.

The pressure of the hydraulic fluid is largely determined by the driving force that the engine 26 imparts on the hydraulic pump 44 to overcome resistance to motion of the hydraulic motor 42. Accordingly, when the engine 26 driving force is increased, the hydraulic fluid pressure increases, the right hydraulic cylinder 32 increases the lifting force applied to the right side of the cutting deck 16, and the traction of the right driving wheel 18 is increased. The amount of increased traction is variable due to the variability of the engine 26 driving force, the resistance to motion of the hydraulic motor 42, and the resistance to motion of the driving wheel 18.

Conversely, when the engine 26 driving force is reduced the hydraulic fluid pressure is reduced, the weight of the cutting deck 16 slides the piston 34 outward from the cylinder 36, and the traction of the drive wheel 18 is returned to a non-increased condition.

The variable force traction enhance systems of the present invention provide increased traction at increased vehicle engine speeds. The increased traction is desirable, for example, when operating the vehicle on flat surfaces or on sloped surfaces. When operating the vehicle on a sloped surface with one drive wheel on the downhill side and one drive wheel on the uphill side, the downhill side wheel may be driven faster to prevent the tractor from heading downhill. In so doing, increased traction is imparted to the downhill drive wheel where the traction is needed most.

Figure 3:
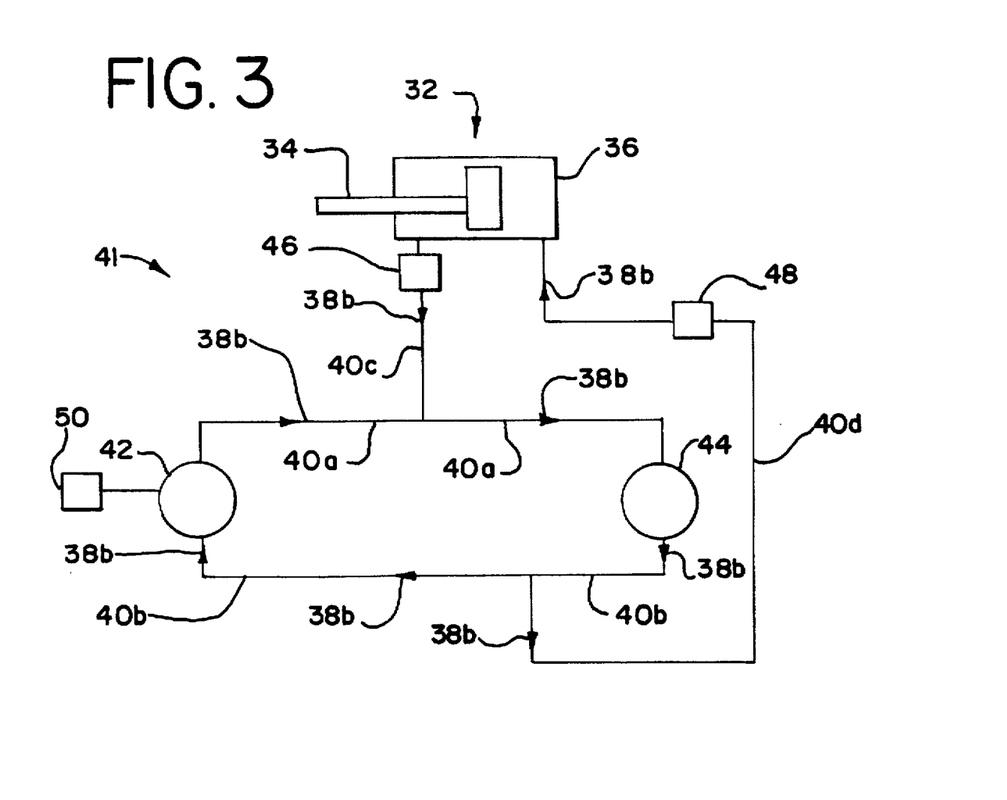
FIG. 3 is a schematic diagram similar to FIG. 2, but showing the direction of hydraulic fluid flow when the vehicle is operating in reverse.

The variable force traction enhance systems may also function as anti-buck devices. As discussed above, the rear end of a tractor vehicle may buck upwardly when the tractor is put into reverse. The schematic diagram of FIG. 3 shows a variable force traction enhance system with the tractor 10 operating in the reverse mode. The arrows 38b show the direction of hydraulic fluid flow with the engine 26 operating in reverse. The hydraulic fluid flows from the hydraulic pump 44 through the hydraulic lines 40b, 40d to the cylinder 36. The pressure of the hydraulic oil entering the cylinder 36 from the hydraulic line 40d extends the piston 34 outwardly from the cylinder 36. As the rear end of the tractor 10 attempts to buck upwardly, a force is exerted on the piston 34 in the direction of compressing the hydraulic assembly 32. However, the hydraulic fluid pressure that extends the hydraulic assembly 32 prevents compression of the hydraulic assembly 32. Accordingly, the rear end of the tractor 10 is prevented from bucking upward. The extending hydraulic assembly 32 may also exert a downward force on the cutting deck 16 to bias the cutting deck 16 against the ground surface.

Referring to FIGS. 2 and 3, pressure regulators 46, 48 may be provided in the hydraulic lines 40c, 40d, respectively. The pressure regulators 46, 48 limit the amount of hydraulic fluid pressure applied to the hydraulic assembly 32. The pressure regulator 46 may limit the maximum lifting force the hydraulic assembly 32 applies to the cutting deck 16 to just less than the lifting force required to lift the cutting deck 16 off the ground. In this manner the maximum tractor traction can be achieved while maintaining the implement in engagement with the ground. Similarly, the pressure regulator 48 can be set to optimize the maximum anti-buck force without excessively biasing the implement towards the ground. Commercially available pressure regulators are suitable for use with the present invention. Such pressure regulators limit the output fluid pressure of a fluid circuit to a predetermined amount regardless of the incoming fluid pressure, provided that the incoming fluid pressure is greater than the desired limited fluid pressure.

The present invention may also include shut-off valves (not shown) to prevent hydraulic fluid flow through the hydraulic lines 40c, 40d and thus, prevent the system from actuating.

The variable force traction enhance systems operate automatically and instantly in response to the engine 26 driving force and the resistance to motion of the hydraulic motor 42.

Particularly, the systems operate automatically and instantly in response to the pressure of the hydraulic fluid in the hydraulic lines 40a, 40b, 40c and 40d. As the hydraulic fluid pressure changes due to various operating conditions of the tractor 10, the hydraulic assembly 32 activates automatically and instantly in response to the change in hydraulic fluid pressure. Further, the hydraulic fluid pressure is proportional to the tractive force of the hydraulic motor 42. The automatic and instantaneous feature of the variable force traction enhance systems applies to both the function of adjusting tractor traction and the function of anti-buck.

Figure 4:
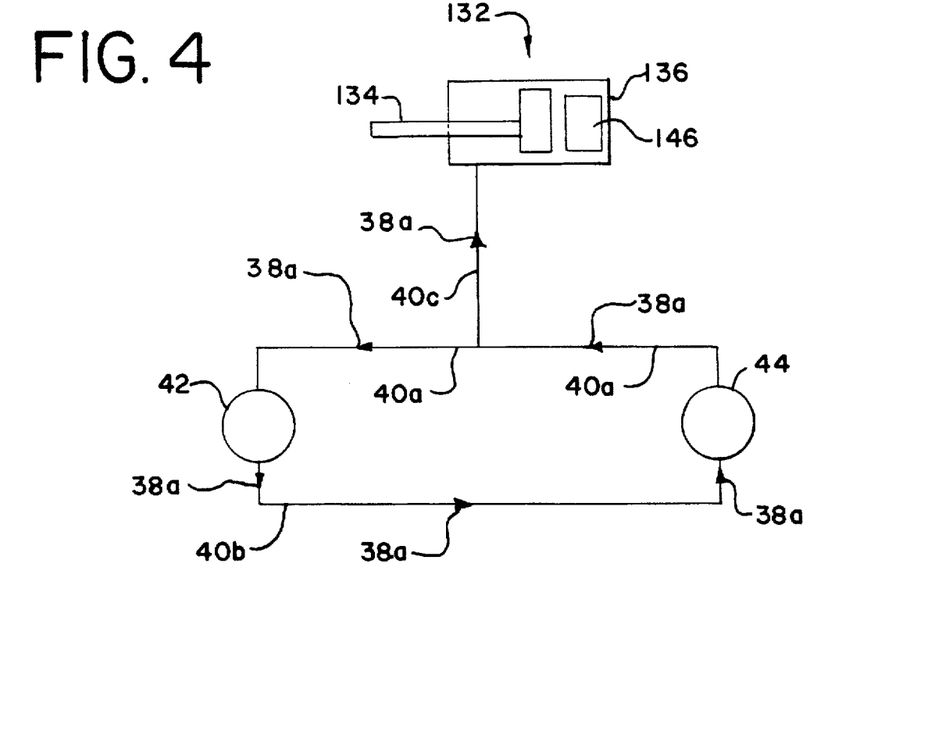
FIG. 4 is a schematic diagram of one alternative embodiment of the present invention having a one-way, hydraulic cylinder.

FIG. 4 is a schematic diagram of an alternative embodiment of the present invention. This embodiment includes a hydraulic assembly 132 having a one-way cylinder 136. Hydraulic oil flows into and out of the cylinder 136 via a single hydraulic line 40c. The hydraulic line 40d shown in FIG. 2 has been removed. As the hydraulic oil flows into the cylinder 136 under pressure, the piston 134 slides into the cylinder 136 and a resilient member 146 is compressed. As the hydraulic oil pressure decreases, the hydraulic oil flows out of the cylinder 136 and the resilient member 146 extends the piston 134 outwardly. The resilient member may be a spring or a compressible chamber of air, for example.

The embodiment shown in FIG. 4 operates similar as described above with reference to FIGS. 1–3. The increased traction provided for the tractor 10 is automatic, instantaneous and proportional to the resistance to tractive effort of the hydraulic motor 42. The resilient member 146 may provide some resistance to bucking of the tractor 10.

Figure 5:
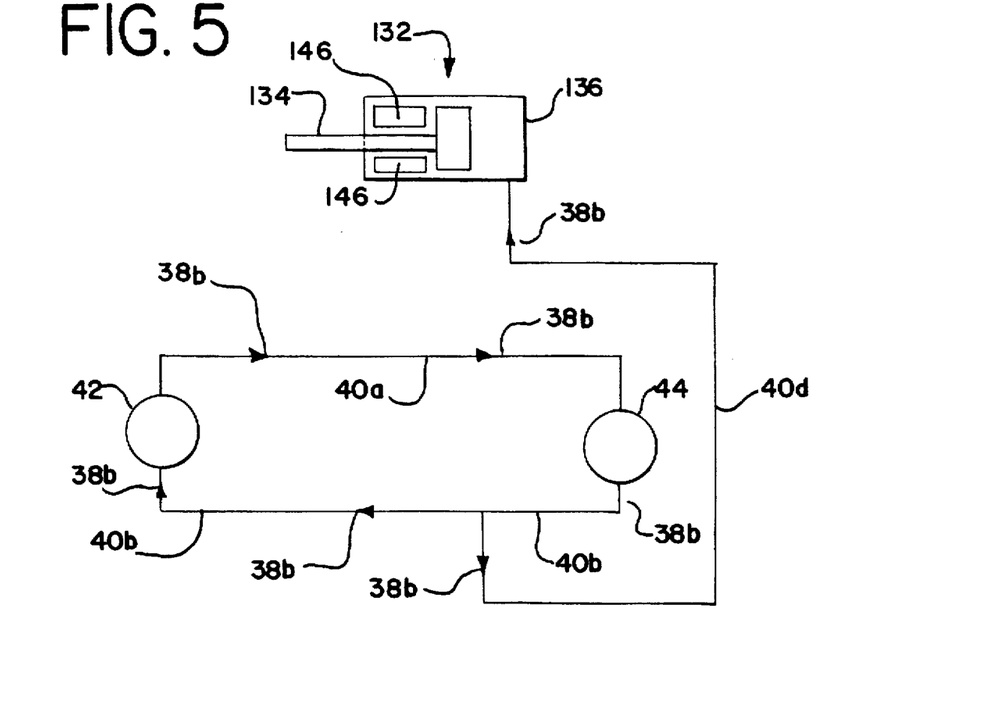
FIG. 5 is a schematic diagram of another alternative embodiment of the present invention having a one-way hydraulic cylinder.

FIG. 5 is a schematic diagram of an alternative embodiment of the present invention. This embodiment includes a hydraulic assembly 132 having a one-way cylinder 136 as shown in FIG. 4. The hydraulic line 40c has been removed, and the resilient member 146 has been moved to an opposite end of the cylinder 136. Also, the hydraulic line 40d has been included in the system.

When the tractor 10 is placed in reverse, the hydraulic oil flows in the direction of the arrows 38b and into the cylinder 136 to prevent bucking. The resilient member 146 returns the hydraulic assembly 132 to a non-activated position when the tractor 10 is operated in the forward direction or when the hydraulic fluid pressure is reduced. This embodiment provides the anti-buck feature as previously described.

Another alternative embodiment of the present invention is similar to the embodiment described with reference to FIGS. 1–3. In this alternative embodiment, only one hydrostatic transmission (which includes a hydraulic pump 44 and a hydraulic motor 42) is utilized. The hydraulic motor 44 drives a differential transmission 50 which drives the drive wheels 18. Differential transmissions are known in the industry and commonly used in vehicles such as cars and tractors. The differential transmission transfers power from a drive shaft to the drive wheels allowing the wheels to rotate at different speeds for following uneven terrain and turning corners. One or more double acting hydraulic assemblies 32 can be utilized as described above to provide the automatic traction enhancement and anti-buck features. When multiple hydraulic assemblies 32 are utilized, the hydraulic assemblies 32 operate concurrently because they are fluidly connected to the same hydrostatic transmission.

Figure 6:
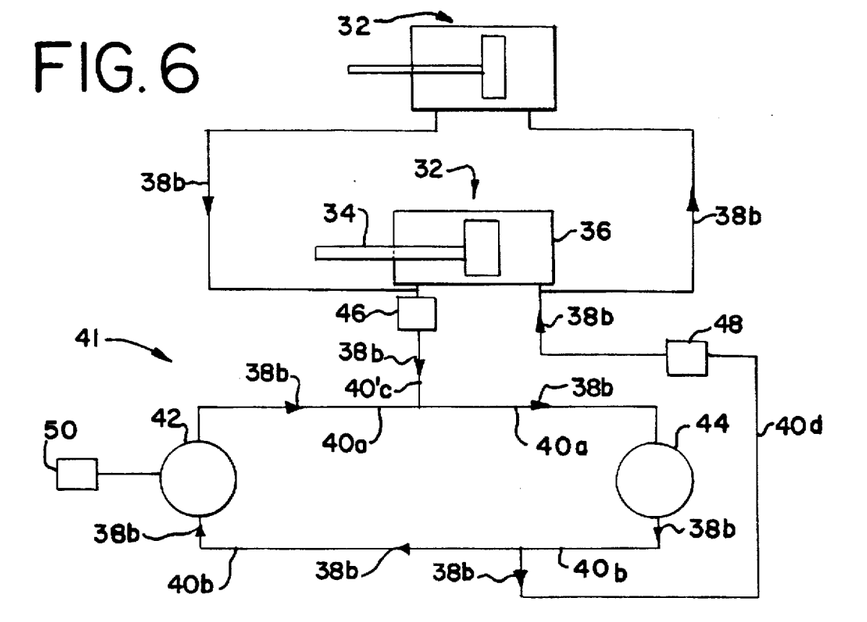
FIG. 6 is a schematic diagram of a variable force traction enhance system having two hydraulic assemblies connected in parallel.
Figure 7:
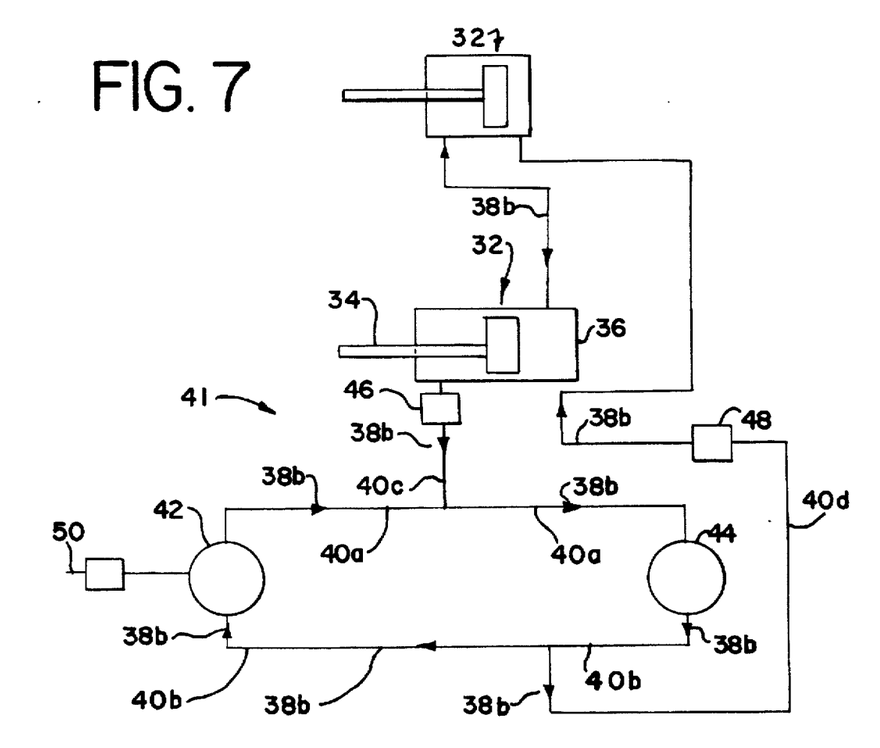
FIG. 7 is a schematic diagram of a variable force traction enhance system having two hydraulic assemblies connected in series.

Referring to FIGS. 6 and 7, when two or more hydraulic assemblies 32 are utilized, the hydraulic supply and return lines may connect the hydraulic assemblies 32 in parallel or series. FIG. 6 shows a schematic diagram of two hydraulic assemblies 32 connected in parallel. FIG. 7 shows a schematic diagram of two hydraulic assemblies 32 connected in series. Both FIGS. 6 and 7 show the direction of hydraulic fluid flow when the vehicle is operating in reverse, as in FIG. 3. Of course, the direction of fluid flow in FIGS. 6 and 7 would be as shown in FIG. 2 when the vehicle is operating in the forward mode.

The size of the hydraulic assemblies of the present invention can be selected to correspond to the desired amount of implement weight transfer. The hydraulic fluid pressures in the system are measured to select the optimal size of the hydraulic assembly. Particularly, the hydraulic fluid pressures in the system are measured when the vehicle is in the forward mode and the vehicle is about to loose traction. The hydraulic fluid pressures are also measured when the vehicle's rear wheels are about to lift off the ground and buck, such as during a sudden stop or when the vehicle is placed in the reverse mode.

While the preferred embodiments have been illustrated and described, numerous changes and modifications can be made without significantly departing from the spirit and scope of this invention. Therefore, the inventors intend that such changes and modifications be covered by the appended claims.

What is claimed is:

1. A hydraulic system for a vehicle having a ground engaging drive wheel and an implement comprising:

a hydraulic pump supplying hydraulic fluid under pressure to a hydraulic motor through a first hydraulic line, the hydraulic motor being connected to the drive wheel, the hydraulic motor having a resistance to motion proportional to a resistance to motion of the drive wheel, the hydraulic fluid pressure being proportional to the hydraulic motor resistance to motion;

a hydraulic cylinder in fluid communication with the first hydraulic line; and, a piston mounted in the cylinder for reciprocating motion, the piston being in fluid contact with the hydraulic fluid in the first hydraulic line, the hydraulic cylinder and piston connecting the vehicle to the implement, wherein the piston and hydraulic cylinder transfer a weight from the implement to the vehicle proportional to the fluid pressure in the first hydraulic line.

2. The hydraulic system of claim 1 wherein the hydraulic cylinder is connected to the implement and the piston is connected to the vehicle.

3. The hydraulic system of claim 1 further comprising a second hydraulic line connected to the hydraulic pump and the hydraulic motor to form a closed loop system.

4. The hydraulic system of claim 3 wherein the hydraulic cylinder is in fluid communication with the second hydraulic line.

5. The hydraulic system of claim 4 wherein the piston and hydraulic cylinder exert a force on the implement proportional to the fluid pressure in the second hydraulic line.

6. The hydraulic system of claim 5 further comprising a pressure regulator fluidly connected to the hydraulic cylinder and piston.

7. The hydraulic system of claim 4 wherein a first auxiliary hydraulic line having a first pressure regulator fluidly connects the hydraulic cylinder to the first hydraulic line.

8. The hydraulic system of claim 7 wherein a second auxiliary hydraulic line having a second pressure regulator fluidly connects the hydraulic cylinder to the second hydraulic line.

9. The hydraulic system of claim 1 wherein the hydraulic cylinder and piston transfers a weight of the implement to the drive wheel when the drive wheel is driving the vehicle in a forward direction.

10. The hydraulic system of claim 1 wherein the hydraulic cylinder is fluidly connected to a second hydraulic line and a fluid pressure in the second hydraulic line extends the piston out of the hydraulic cylinder when the vehicle is operating in a reverse mode.

11. The hydraulic system of claim 1 wherein the vehicle comprises at least first and second hydraulic systems, the first hydraulic system associated with a first drive wheel and actuates a first portion of the implement with a first piston and hydraulic cylinder, the second hydraulic system associated with a second drive wheel and actuates a second portion of the implement with a second piston and hydraulic cylinder.

12. The hydraulic system of claim 11 wherein a portion of the weight of the implement is shifted to the first drive wheel when the first hydraulic system actuates the first portion of the implement, and another portion of the weight of the implement is shifted to the second drive wheel when the second hydraulic system actuates the second portion of the implement.

13. The hydraulic system of claim 12 wherein the first hydraulic system further comprises a first pressure regulator fluidly connected to the first hydraulic cylinder, and the second hydraulic system further comprises a second pressure regulator fluidly connected to the second hydraulic cylinder.

14. The hydraulic system of claim 1 wherein a first auxiliary hydraulic line fluidly connects the hydraulic cylinder to the first hydraulic line, and the hydraulic system further comprises a first pressure regulator in the first auxiliary hydraulic line.

15. The hydraulic system of claim 1 further comprising a first pressure regulator fluidly connected to the hydraulic cylinder and the first hydraulic line.

16. A vehicle comprising:

a frame having two opposed drive wheels positioned on opposite sides of the vehicle, the wheels capable of being independently driven at various speeds;

an implement movably connected to the frame;

a pair of opposed lifting arms, one of each lifting arm movably connecting the frame to the implement on opposite sides of the vehicle, one of each lifting arm being associated with a drive wheel; and, means responsive to the speed of each drive wheel for independently controlling the lifting arm associated with the drive wheel.

17. The vehicle of claim 16 wherein the means comprises a pair of hydrostatic transmissions, each hydrostatic transmission associated with one drive wheel and one lifting arm.

18. The vehicle of claim 17 wherein each lifting arm imparts a lifting force on the implement in response to a resistance to motion of a drive wheel, the lifting force transferring weight of the implement to the drive wheel.

19. The vehicle of claim 18 wherein each lifting arm is a double acting hydraulic cylinder.

20. The vehicle of claim 18 wherein each lifting arm is a one way hydraulic cylinder.

21. The vehicle of claim 12 wherein each lifting arm imparts a downward force on the implement in response to a drive wheel slowing down and, alternatively, in response to the hydrostatic transmission operating in a reverse mode, the downward force preventing a rear end of the vehicle from lifting off of a ground surface.

22. The vehicle of claim 21 wherein each lifting arm is a double acting hydraulic cylinder.

23. The vehicle of claim 21 wherein each lifting arm is a one way hydraulic cylinder.

24. The vehicle of claim 21 wherein the means further comprises a pair of first pressure regulators, each first pressure regulator associated with one hydrostatic transmission, one drive wheel, and one lifting arm.

25. The vehicle of claim 24 wherein the means further comprises a pair of second pressure regulators, each second pressure regulator associated with one hydrostatic transmission, one drive wheel, and one lifting arm.

26. The vehicle of claim 18 wherein the means further comprises a pair of pressure regulators, each pressure regulator associated with one hydrostatic transmission, one drive wheel, and one lifting arm.

27. The vehicle of claim 17 wherein each lifting arm imparts a lifting force on the implement in response to a resistance to motion of a drive wheel when the vehicle is operating in a forward mode, the lifting force transferring weight of the implement to the drive wheel to improve traction, and wherein each lifting arm imparts a downward force on the implement in response to the vehicle slowing down and, alternatively, in response to the vehicle operating in a reverse mode, the downward force preventing a rear end of the vehicle from lifting off of a ground surface.

28. The vehicle of claim 27 wherein each lifting arm is a double acting hydraulic cylinder.

29. The vehicle of claim 27 wherein each lifting arm is a one way hydraulic cylinder.

30. The vehicle of claim 27 wherein the means further comprises a pair of first pressure regulators, each first pressure regulator associated with one hydrostatic transmission, one drive wheel, and one lifting arm.

31. The vehicle of claim 30 wherein the means further comprises a pair of second pressure regulators, each second pressure regulator associated with one hydrostatic transmission, one drive wheel, and one lifting arm.

32. The vehicle of claim 17 wherein the means further comprises a pair of pressure regulators, each pressure regulator associated with one hydrostatic transmission, one drive wheel, and one lifting arm.

33. The vehicle of claim 32 wherein each lifting arm is fluidly connected to one hydrostatic transmission by a first fluid line comprising one pressure regulator.

34. The vehicle of claim 33 wherein each lifting arm is fluidly connected to one hydrostatic transmission by a second fluid line comprising another pressure regulator.

35. A vehicle comprising:
an engine mounted on a frame;
a hydrostatic transmission driven by the engine;
a differential transmission driven by the hydrostatic transmission;
two opposed drive wheels positioned on opposite sides of the vehicle, each drive wheel being driven by the differential transmission;
an implement movably connected to the frame; and,
an actuating arm connected to the frame and to the implement, the actuating arm being in fluid communication with the hydrostatic transmission and actuating the implement in response to fluid pressure in the hydrostatic transmission.

36. The vehicle of claim 35 wherein the actuating arm imparts a lifting force on the implement and shifts a portion of implement weight to a drive wheel when the vehicle is operating in a forward mode.

37. The vehicle of claim 36 further comprising a pressure regulator in a fluid line connecting the actuating arm to the hydrostatic transmission.

38. The vehicle of claim 35 wherein the actuating arm imparts a downward force on the implement and prevents a rear end of the vehicle from bucking upwardly.

39. The vehicle of claim 38 further comprising a pressure regulator in a fluid line connecting the actuating arm to the hydrostatic transmission.

40. The vehicle of claim 35 wherein the vehicle comprises two or more actuating arms operating concurrently to actuate the implement.

41. The vehicle of claim 40 wherein each actuating arm is fluidly connected to the hydrostatic transmission by a fluid line comprising a pressure regulator.

\* \* \* \* \*

UNITED STATES PATENT AND TRADEMARK OFFICE
CERTIFICATE OF CORRECTION

PATENT NO. : 5,784,867
DATED : July 28, 1998
INVENTOR(S) : Douglas McFarland and Donald H. Parkes It is certified that error appears in the above-identified patent and that said Letters Patent are hereby corrected as shown below:

Column 8, line 60, Claim 21 on issued patent reads: "The vehicle of claim 12..." However, Claim 21 should read: "The vehicle of claim 18..."

Signed and Sealed this

Twelfth Day of January, 1999

Attest:

Attesting Officer

*Acting Commissioner of Patents and Trademarks*